United States Patent [19]

Sakurai

[11] Patent Number: 5,289,364
[45] Date of Patent: Feb. 22, 1994

[54] POWER SUPPLY FOR AN ELECTRONIC DEVICE

[75] Inventor: Akihiro Sakurai, Isehara, Japan

[73] Assignee: Hitachi, Ltd., Tokyo, Japan

[21] Appl. No.: 886,096

[22] Filed: May 21, 1992

[30] Foreign Application Priority Data

May 28, 1991 [JP] Japan ................ 3-123338

[51] Int. Cl.⁵ .................................. H02M 1/14
[52] U.S. Cl. .................... 363/147; 363/45; 323/267; 307/43
[58] Field of Search .............. 363/147, 46, 45; 307/43, 60, 52, 54; 323/267

[56] References Cited

U.S. PATENT DOCUMENTS

| | | | |
|---|---|---|---|
| 4,698,517 | 10/1987 | Tohya et al. | 307/43 |
| 4,866,295 | 9/1992 | Leventis et al. | 307/43 |
| 4,868,732 | 9/1989 | Gillet et al. | 363/90 |

FOREIGN PATENT DOCUMENTS 1-120098  5/1989  Japan.

Primary Examiner—Steven L. Stephan
Assistant Examiner—Adolf Berhane
Attorney, Agent, or Firm—Fay, Sharpe, Beall, Fagan, Minnich & McKee

[57] ABSTRACT

Since a plurality of AC power supplies have output voltages controlled independently from each other and separate reference potential bus bars are connected with reference potential terminals of a plurality of DC power supplies connected with the different AC power supplies, respectively, power supply ripples contained in DC supplied to an electronic device can be reduced and it is possible to suppress generation of a beat produced by the fact that power supply ripples having frequencies deviated from each other interfere with each other. In this way fluctuations in the voltage of DC supplied to the electronic device are decreased and a working margin test for LSIs within the electronic device can be effected easily with a high reliability.

38 Claims, 4 Drawing Sheets

FIG. 5

POWER SUPPLY FOR AN ELECTRONIC DEVICE

BACKGROUND OF THE INVENTION

The present invention relates to a power supply for an electronic device such as a large scale electronic computer, etc. and in particular to a power supply capable of effecting easily a working margin test for LSIs in the electronic device by feeding it with power from a plurality of AC power supplies.

Since an electronic device such as a large scale electronic computer, etc. consumes high electric power, current intensity of a power supply thereto is as high as several thousands of amperes. In order to feed it stably with such electric power, an AC stabilizing device such as an MG (Motor Generator) set, etc. is used, which stabilizes commercial AC, and this stabilized AC is rectified by a DC power supply, which converts it into a DC having a required voltage. As disclosed by JP-A-Hei 1-120098, the DC thus obtained is supplied to logic units constituting the electronic device by means of a bus bar made of copper having a large current capacity.

Since a significant power supply ripple (pulsating component) is superposed usually on this DC obtained by rectification in the DC power supply, it is tried to reduce the power supply ripple by using an inductance of the bus bar and a smoothing condenser mounted between a bus bar for each of different voltages and a reference potential bus bar in the neighborhood of the logic units.

The reference potential bus bar is used in common for all the DC voltages in order to make the reference potential uniform within the logic units and to simplify the construction thereof.

Heretofore one AC power supply was disposed for each of the logic units to feed it with electric power.

In an electronic device using such a power supply, in the case where a working margin test is effected for LSIs in the logic units, there are no problems e.g. for a test effected by increasing or decreasing simultaneously all the voltages applied to the different logic units by a predetermined ratio, but for a test effected by increasing only specified voltages among the plurality of voltages by a predetermined ratio and decreasing the other voltages by another predetermined ratio or vice versa, one AC power supply cannot deal therewith. Therefore one or a plurality of other AC power supplies were provided and the test was effected by connecting them newly with a plurality of DC power supplies within the power supply.

As described above, by such a prior art power supply, it was necessary to reconnect the AC power supplies, every time a working margin test was effected for LSIs in the different logic units, which was troublesome and worsened operation efficiency.

SUMMARY OF THE INVENTION

In order to effect such a working margin test with a high efficiency, it is conceivable to provide the previous power supply with a plurality of AC power supplies.

However, if merely a plurality of AC power supplies are disposed, since the AC frequencies outputted by these AC power supplies are not perfectly synchronized, in the case where the logic units are fed by the plurality of AC power supplies, power supply ripples contained in the DCs after rectification by the DC power supplies have different frequencies and these power supply ripples interfere with each other to produce a beat.

Because of this beat, fluctuations in the DC voltages supplied to the LSIs within the logic units increase and erroneous operations of the LSIs can take place, etc., which lowers the working margin of the LSIs.

In this way reliability of the working margin test for LSIs is remarkably lowered.

The object of the present invention is to provide a power supply capable of reducing power supply ripples contained in the DCs supplied to the LSIs within the logic units so as to suppress generation of a beat produced by interference between power supply ripples having frequencies deviated from each other and of executing easily the working margin test for the LSIs with a high reliability.

That is, in a power supply to an electronic device according to the present invention outputted AC voltages can be controlled independently from each other and it is composed of a plurality of AC power supplies, for which AC frequencies outputted by them are asynchronous; a plurality of DC power supplies, which rectify the ACs outputted by the AC power supplies to convert them into DCs; and bus bars connecting the DC power supplies with different logic units. Reference potential terminals of a plurality of DC power supplies fed with AC from a same AC power supply are connected with a same common reference potential bus bar, while reference potential terminals of another plurality of DC power supplies fed with AC from another AC power supply are connected with a common reference potential bus bar different from the reference potential bus bar stated above.

Further, in the construction of the power supply according to the present invention each of the reference potential bus bars separated from each other is disposed in a logic unit and connected with boards in common, the potential thereof itself serving as a reference potential.

Furthermore, in the construction described above of the power supply according to the present invention each of the AC power supplies is of motor generator set type, consisting of an induction motor driven by commercial three-phase AC and a generator coupled directly with this induction motor. The induction motor is rotated by commercial three-phase AC and outputs an AC having a frequency higher than the commercial three-phase AC. Still further, in the construction described above of the power supply according to the present invention the separated reference potential bus bars are formed in one body, putting insulators therebetween in a part of the path thereof.

By such a power supply, since there are disposed a plurality of AC power supplies, whose output voltages can be controlled independently from each other, it is possible to execute easily a working margin test, by which only specified voltages among a plurality of DC voltages supplied to LSIs within the logic units are increased by a predetermined ratio and the other voltages are decreased by another predetermined ratio. Further, in the power supply described above, since there are disposed separately reference potential bus bars corresponding to different AC power supplies, DCs containing power supply ripples having different frequencies supplied by DC power supplies connected with different asynchronous AC power supplies never flow through a same reference potential bus bar. In this way, it is possible to suppress generation of beat produced by the fact that the power supply ripples having different frequencies interfere with each other, without using any extra parts.

Further it is desired that the reference potentials for the logic units are as uniform as possible and in the power supply, since boards disposed in each of the logic units use the potential thereof itself as the reference voltage and the separate reference voltage bus bars are connected therewith in common, the reference voltages can be made uniform.

Furthermore, by forming the separate reference voltage bus bars in one body, putting insulators therebetween in a part of the path, mounting thereof requires a space for only one and it is possible to reduce the size of the power supply.

As the result, fluctuations in the DC voltages supplied to LSIs within the logic units are reduced and a working margin test for LSIs can be effected easily without any trouble with a very high reliability. Thus the reliability of the electronic device is increased.

DESCRIPTION OF THE PREFERRED EMBODIMENTS

Figure 1:
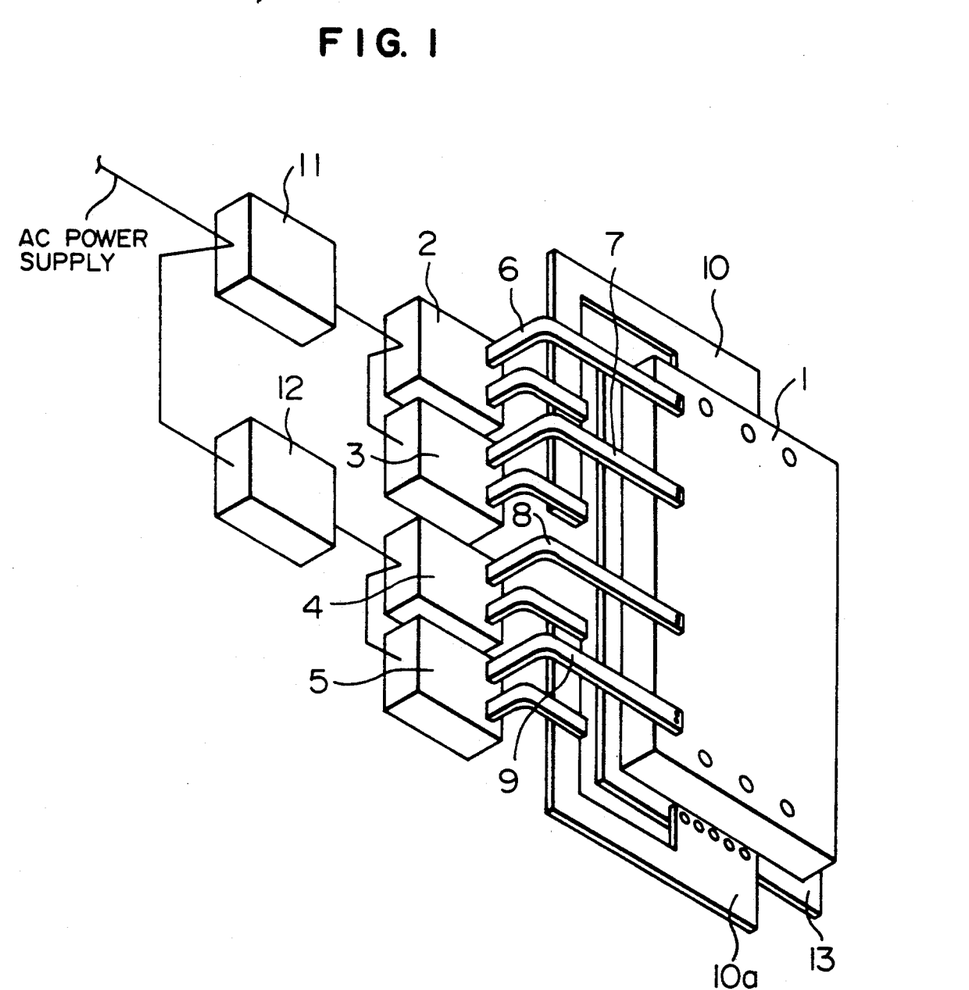
FIG. 1 is a perspective view of a power supply and an electronic device representing an embodiment of the present invention.

In FIG. 1, an electronic device in the present embodiment includes a logic unit 1, a plurality of DC power supplies 2, 3, 4 and 5, which are connected with the logic unit 1 through connecting bus bars 6, 7, 8 and 9, and a plurality of reference potential bus bars 10 and 10a.

The plurality of DC power supplies 2, 3, 4 and 5 have DC voltages outputted thereby different in level from each other so that the logic unit 1 can be fed with DC voltages different from each other (4 kinds in the present embodiment), which are required for driving a number of LSIs.

The DC power supplies 2 and 3 are arranged in parallel to each other and connected through cables with a same AC power supply 11. They are so constructed that they are fed AC from an AC power supply 11 and rectify the AC to convert it into DCs, which are supplied to the logic unit. Further the DC power supplies 4 and 5 are arranged also in parallel to each other and connected through cables with an AC power supply 12, which is different from the AC power supply 11. They are so constructed that they are fed AC from the AC power supply 12 and rectify the AC to convert it into DCs, which are supplied to the logic unit.

The AC power supplies 11 and 12 are so constructed that they are fed with commercial three-phase AC from a same commercial electric power network not indicated in the figure.

In this case potentials different from each other for the plurality of DC power supplies 2, 3, 4 and 5 are connected with LSIs of the logic unit 1 through connecting bus bars 6, 7, 8 and 9, respectively. Further the reference potentials (e.g. ground potential) for the DC power supplies 2 and 3 connected with the AC power supply 11 are connected with the reference potential bus bar 10 in common and the reference potentials for the DC power supplies 4 and 5 connected with the AC power supply 12, which is different from the AC power supply 11, are connected with the reference potential bus bar 10a in common. The reference potential bus bars 10 and 10a are separated from each other.

On the other hand a back board frame 13, which is formed so as to surround the logic unit 1, is mounted on the side surfaces thereof. The reference potential bus bars 10 and 10a are connected with the back board frame 13 at two sides opposite to each other.

This back board frame 13 itself is at the reference potential (0 V). The reference potential (0 V) of the logic unit 1 can be made uniform by connecting the separated reference potential bus bars 10 and 10a therewith. Here what should be remarked is that the reference potential bus bars 10 and 10a are disposed separately, corresponding to the different AC power supplies.

Hereinbelow the operation of the power supply in the present embodiment and the electronic device using it will be explained.

In the case where a working margin test is effected for a plurality of LSIs within the logic unit 1, it is effected by increasing or decreasing simultaneously all the voltages supplied to the LSIs by a predetermined ratio. Apart therefrom, a working margin test should be effected by increasing only specified voltages among the plurality of voltages and by decreasing the other voltages or vice versa.

In the present embodiment, in order to effect easily such a working margin test without any troublesome work, the logic unit 1 is fed from the two AC power supplies 11 and 12.

The AC power supplies 11 and 12 have a same structure. Concretely speaking, both of them are of motor-generator set type and each of them consists of an induction motor driven by commercial three-phase AC and a generator coupled directly therewith. In both the AC power supplies 11 and 12, the induction motors are rotated by commercial three-phase AC from a same commercial AC electric power network and the generators output ACs having frequencies higher than the commercial three-phase AC.

Each of the generators is provided with a voltage controlling mechanism, which can control the AC voltage outputted by the generator to vary it. This voltage controlling mechanism is operated by an external device not indicated in the figure and in this way the AC power supplies 11 and 12 can vary the AC voltages outputted by them independently from each other.

Since the DC power supplies 2 and 3 are fed with AC from a common AC power supply 11, the DC voltages outputted by them can be varied correspondingly by varying the AC voltage outputted by the AC power supply 11.

This is true also for the DC power supplies 4 and 5 fed with AC from a common AC power supply 12.

Consequently, when a working margin test is effected for the LSIs within the logic unit 1, it can be effected while varying independently the voltages outputted by the DC power supplies 2 and 3 as well as the DC power supplies 4 and 5 by different predetermined ratios by varying the output voltages of the AC power supplies by the predetermined ratios, respectively.

Here, although the induction motors driven by commercial AC rotate originally in synchronism with the frequency of the commercial AC, torque is produced in the motors by loads and the motors rotate with small delays (slips are produced). Although the AC power supplies 11 and 12 are set so as to obtain outputs having a same frequency, since the loads for the two are not uniform, some deviation is produced in the output frequencies by these slips.

Therefore the outputted AC frequencies are not completely in accordance with the required frequency and ACs having slightly deviated frequencies are outputted. In addition, since delay in the rotation of a motor is proper to each induction motor, delays in the rotation of the AC power supplies 11 and 12 are different from each other and therefore the AC power supplies 11 and 12 output ACs having slightly deviated frequencies.

The DCs outputted by the DC power supplies 2, 3, 4 and 5 contain different power supply ripples (pulsating component) and the frequencies of these power supply ripples are determined by the frequencies of the ACs converted into the DCs. The DC power supplies 2, 3, 4 and 5 have no mechanism for regulating the phases of the frequencies. Therefore, when the frequencies outputted by the AC power supplies 11 and 12 are slightly deviated from each other, the phases of the frequencies of the power supply ripples contained in the DCs outputted by the DC power supplies are also slightly deviated from each other.

Here, if the reference potentials of the DC power supplies 2, 3, 4 and 5 outputting the DCs containing power supply ripples having phases of frequency deviated from each other described previously are connected with a same reference potential bus bar as by the prior art technique, since the DCs containing power supply ripples having phases of frequency deviated from each other flow through the bus bar, the power supply ripples having deviated phases of frequency interfere with each other to produce a beat (phenomenon that the ripple frequency doesn't vary, when they are in same phase, but they are intensified mutually and the ripple frequency increases, when they are in opposite phase).

Here a bus bar has a self inductance determined by the shape thereof. This self inductance L is given by a following equation;

$$L = \frac{\mu_0}{2\pi} l \left( \ln \frac{2l}{a+b} + 0.5 \right)$$

a: thickness of bus bar
b: width of bus bar
l: length of bus bar

This self inductance of the bus bar has an effect of reducing the power supply ripple contained in the DC flowing through the bus bar. This effect varies, depending on the magnitude of the self inductance and the effect increases with increasing self inductance L.

However, in the case where power supply ripples in opposite phase flow through the bus bar, the effects of the self inductance of the bus bar thereon compensate each other and the power supply ripples are not reduced. That is, the beat produced by the fact that the power supply ripples having phases of frequency deviated from each other interfere with each other is not reduced by the self inductance L and and the beat is supplied to the logic unit as it is, which has bad influences on the working margin of LSIs.

Therefore, in order to suppress generation of this beat and to reduce the power supply ripples, the reference potentials of the two DC power supplies, DC power supplies 2 and 3 on one hand and DC power supplies 4 and 5 on the other hand, outputting DCs having power supply ripples having phases of frequency deviated from each other are connected with different reference potential bus bars 10 and 10a separated from each other. In this way the DCs outputted by the DC power supplies 2 and 3 flow through the reference potential bus bar 10, while the DCs outputted by the DC power supplies 4 and 5 flow through the reference potential bus bar 10a. Therefore it doesn't take place that the power supply ripples having phases of frequency deviated from each other interfere with each other in a bus bar and thus generation of the beat in the power supply path is suppressed.

Further the reference potential bus bars 10 and 10a reduce the power supply ripples contained in the DCs supplied by the DC power supplies 2 and 3 as well as the DC power supplies 4 and 5, with which the respective reference potentials are connected, by the effect of the respective self inductances L thereof and supply the DCs to the logic unit 1.

Since the reference potential of the DC power supplies 2 and 3 and the reference potential of the DC power supplies 4 and 5 are connected with the separate reference potential bus bars 10 and 10a, respectively, as described above, the reference potential of the DC power supplies 2 and 3 and the reference potential of the DC power supplies 4 and 5 are not equalized to each other. However, since the reference potential within the logic unit should be made as uniform as possible, this inequality in the potential produced by the fact that the reference potential bus bars are separated should be regulated.

Therefore, in the present embodiment, a back board frame 13, for which the potential thereof itself serves as the reference potential (0 V), is disposed on the logic unit 1 and the reference potential is made uniform at parts very close to the logic unit 1 by connecting the reference potential bus bars 10 and 10a therewith.

In this case, the power supply ripples contained in the DCs supplied by the DC power supplies 2 and 3 and the DCs supplied by the DC power supplies 4 and 5 are satisfactorily reduced in the reference potential bus bars 10 and 10a by the effect of the respective self inductances thereof. Therefore, even if the power supply ripples thereof interfere with each other, they have almost no influences on the LSIs. Further these DCs supplied to the back board frame 13 are supplied to the LSIs within the logic unit 1 almost completely and almost no DCs flow through the back board frame 13. Therefore, even if a beat is produced in the back board frame 13, it is extremely weak and has almost no influences on the LSIs.

As the result it is possible to feed a plurality of LSIs within the logic unit 1 with DCs, for which generation of a beat having bad influences on the working margin of the LSIs is suppressed and the power supply ripples are reduced.

Figure 3:
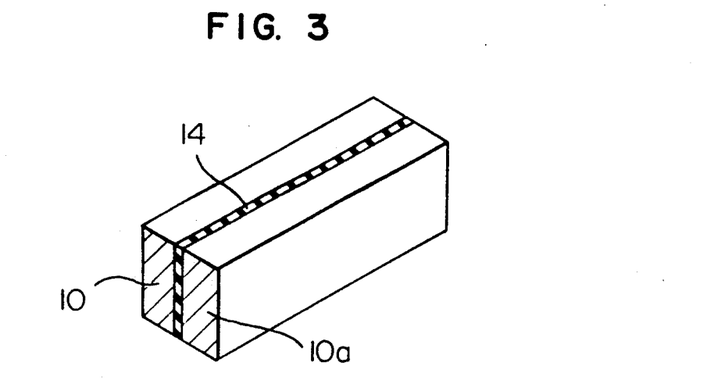
FIG. 3 is a perspective view indicating 0 V bus bars formed in one body in another embodiment of the present invention.

While, in the present embodiment, an example is indicated, in which the reference potential bus bars 10 and 10a are connected with the logic unit from the right and the left thereof, FIG. 3 shows an example of the construction of the reference potential bus bars 10 and 10a e.g. in the case where there is a space therefor only at either one of the right and the left of the logic unit 1. As indicated in this figure, the reference potential bus bars 10 and 10a are formed in one body, putting an insulator 14 therebetween. Since the insulator 14 is put therebetween, the DCs flowing through the reference potential bus bars 10 and 10a don't interfere with each other.

In this way the reference potential bus bars 10 and 10a can be mounted in a space sufficient only for one bus bar between the DC power supplies and the logic unit 1, which can contribute to down sizing of the electronic device.

Although, in the above, the invention made by the inventors has been explained concretely, based on the embodiments, it will be obvious that the present invention is not limited to the embodiments described above, but various modifications may be made without departing from the present invention in its broader aspect.

For example, although in the present embodiment only one DC power supply is indicated for one same voltage, a plurality of DC power supplies may be disposed for one same voltage.

Further, although in FIG. 1 the connecting bus bars 6 to 9 having different voltages are connected with the logic unit 1 on one side thereof, a construction may be adopted, in which they are connected therewith on two sides thereof. Also for the connection of the common potential bus bars 10 and 10a, although in FIG. 1 they are connected with the back board frame 13 on the left and right sides thereof, they may be connected therewith at any parts such as upper and lower sides, central part, etc., if they are close to the logic unit 1.

Figure 2:
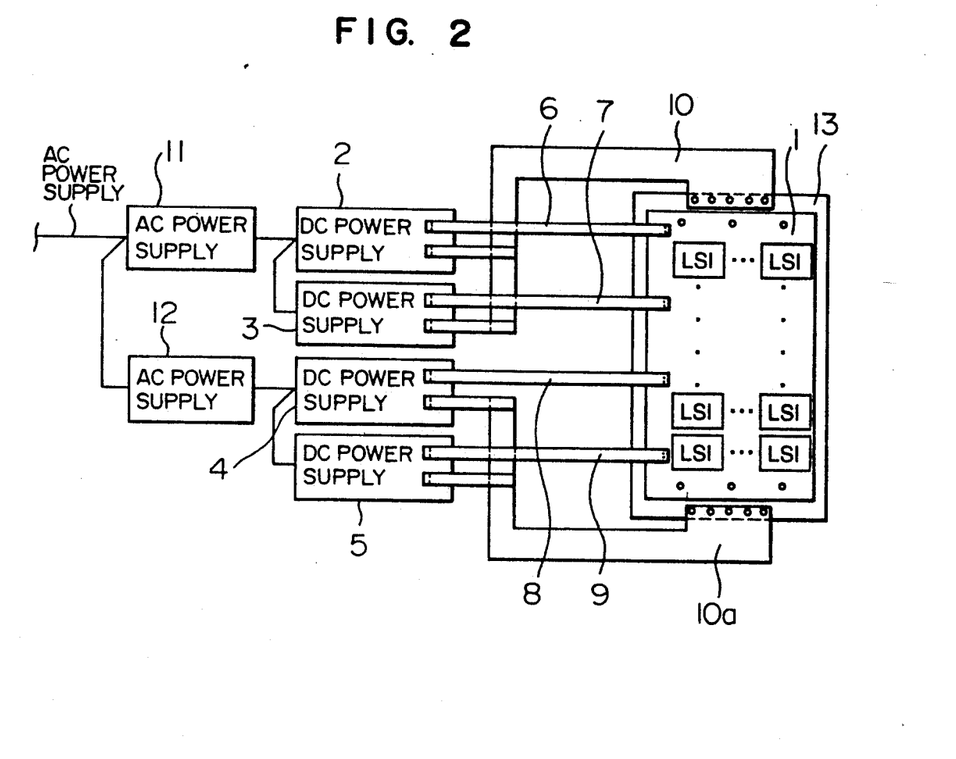
FIG. 2 is a side view of the power supply and the electronic device indicated in FIG. 1.

Furthermore, although in FIGS. 1 and 2 the arrangement of the DC power supplies 2 to 5 is indicated longitudinally, they may be arranged transversally.

Effects obtained by representative one of the inventions disclosed in the present application will be explained briefly, as described below.

That is, the power supply according to the present invention is a power supply, in which, in order to effect easily a working margin test for a number of LSIs within a logic unit constituting an electronic device, there are disposed a plurality of AC power supplies for one logic unit so that ACs are fed from the plurality of AC power supplies without disposing any special device for synchronizing perfectly the frequencies of the ACs supplied by these AC power supplies. Since it is possible to reduce power supply ripples contained in the DCs supplied to the logic unit and to suppress generation of a beat by separately disposing the reference potential bus bars connecting the reference potentials of the DC power supplies, corresponding to these plurality of different AC power supplies, variations in the DC voltages supplied to the logic unit are decreased and thus it is possible to secure a satisfactory working margin for LSIs.

Further it is possible to keep the space for mounting a plurality of reference potential bus bars as small as possible to prevent increase in the size of the power supply by forming the plurality of separated reference potential bus bars in one body, putting an insulator therebetween, between the DC power supplies and the logic unit.

As the result, it is possible to effect easily working margin test for the LSIs with a very high reliability and thus reliability of the electronic device can be increased.

The following is an example of physical and electrical specifications of the present embodiment.

In this example, the length of the reference potential bus bar (10 or 10a) is 800~1000 mm and its inductance is 300~500 nH. The length of a bar extending from DC power supply to the bus bar (10 or 10a) is 500~1300 mm and its inductance is 150~400 nH. The length of a bar extending from DC power supply to the back board from 13 is 500~1300 mm and its inductance is 150~400 nH.

Assuming that the DC power supply generate −2 Volt, −3 Volt, −4 Volt and −5.2 V, the magnitude of the power supply ripples are as follows.

|  | at a terminal of a power supply | at the back board frame |
| --- | --- | --- |
| −2 V | 410 mV | 15 mV |
| −3 V | 570 mV | 25 mV |
| −4 V | 710 mV | 50 mV |
| −5.2 V | 890 mV | 55 mV | wherein the above figures are obtained without considering the beat.

Figure 4:
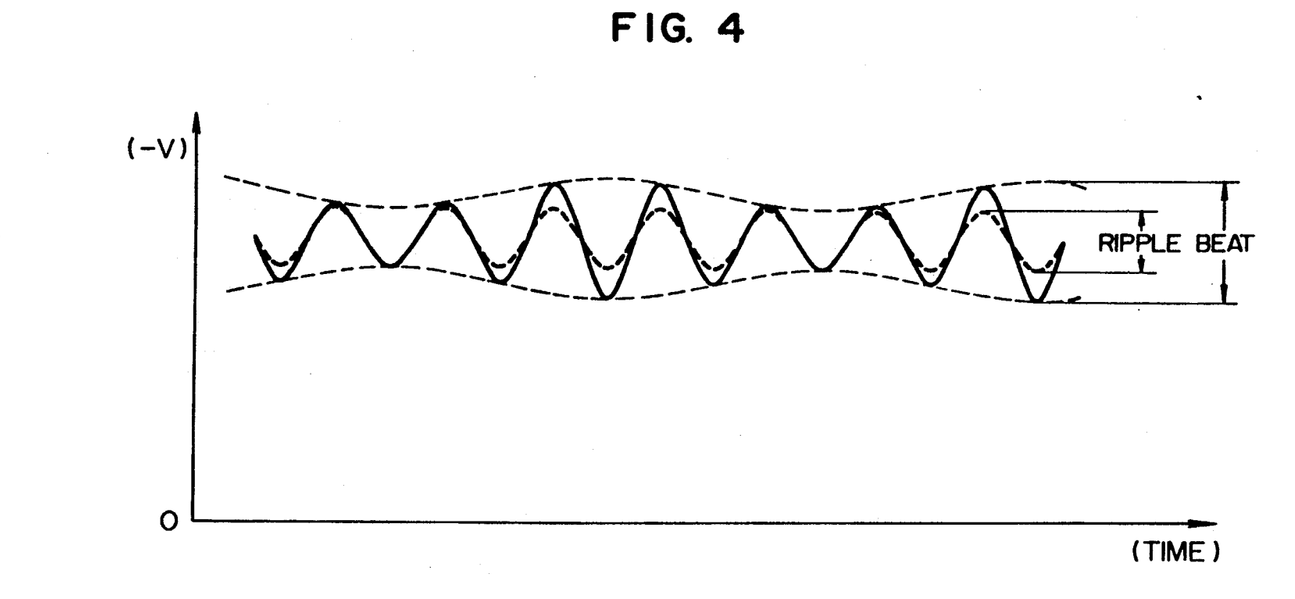
FIG. 4 shows a wave form which appears on the back board frame.
Figure 5:
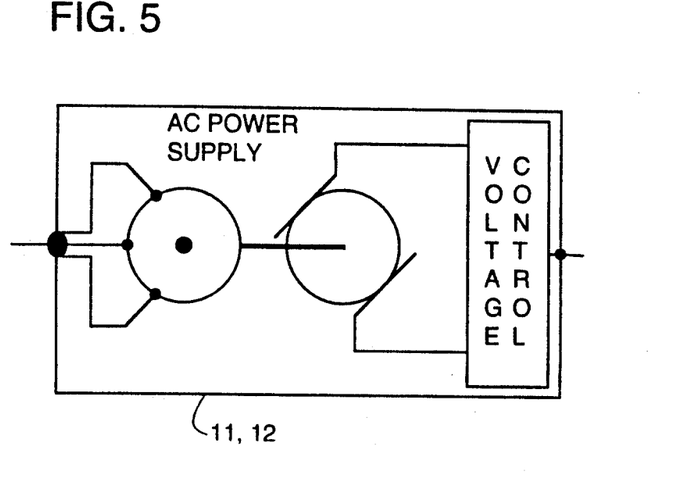
FIG. 5 is an enlarged view of a portion of FIG. 2.

FIG. 4 shows a wave form which appears on the back board frame. If the phase of ripples on the bus bars 10 and 10a are synchronized with each other, then the wave form is a broken line, that is the same as the wave form of ripples.

Indeed, the phases on the bus bars 10 and 10a are not synchronized at all. Therefore, the beat appears on the wave form. However, the magnitude of the beat is reduced according to the embodiment.

The following is the magnitude of the beat which appears on the back board frame according to the inventor's analysis, to show the benefit of the embodiment. The data obtained with the embodiment is compared with data obtained from a similar conventional structure obtained without using the invention, that is to represent the conventional structure the bus bar 10 and bus bar 10a are commonly connected at the point adjacent to the power supplies.

|  | bus bar 10 and 10a are connected commonly | bus bar 10 and 10a are separated according to the invention |
| --- | --- | --- |
| −2 Volt | 25 mVolt | 17 mVolt |
| −3 Volt | 45 mVolt | 30 mVolt |
| −4 Volt | 80 mVolt | 55 mVolt |
| −5.2 Volt | 75 mVolt | 60 mVolt |

According to the example, the magnitude of the beat is reduced more than 20% when comparing data obtained under the above two circumstances.

While a preferred embodiment has been specific details, further embodiment, modifications and variations are contemplated according to the broader aspects of the present invention, all as determined by the spirit and scope of the following claims.

What is claimed is:

1. A power supply for an electronic device composed of a plurality of logic units comprising:
   a first AC power supply stabilizing AC supplied by commercial AC network to output it and a second AC power supply disposed in parallel with respect to said first AC power supply and similarly stabilizing AC supplied by the same commercial AC network to output an AC having a frequency, which is asynchronous to the frequency of the AC outputted by said first AC power supply;

a plurality of DC power supplies connected with said first AC power supply and converting the AC supplied by said first AC power supply into DC to output it;

a plurality of DC power supplies connected with said second AC power supply and converting the AC supplied by said second AC power supply into DC to output it;

a first reference potential bus bar applying a reference potential to said logic units, one end of which is connected at a connecting part with said plurality of DC power supplies connected with said first AC power supply in common, and another end of which is sufficiently far from said connecting part and connected with said logic units at another connecting part;

a second reference potential bus bar applying a reference potential to said logic units, one end of which is connected at a connecting part with said plurality of DC power supplies connected with said second AC power supply in common, and another end of which is sufficiently far from said connecting part and connected with said logic units at another connecting part, a part of a path thereof between the two connecting parts being located away from said first reference potential bus bar;

a plurality of connecting bus bars applying voltages necessary for driving LSIs within said logic units thereto, one end of each of which is connected with a voltage output terminal of each of said plurality of DC power supplies, and another end of each of which is connected with said logic unit; and a board disposed on said logic unit, whose potential itself serves as a reference potential, the other ends of said first and said second reference potential bus bar, which ends are different from said connecting parts connected with the reference potentials of said DC power supplies, being connected with said board so as to make the reference voltage applied to said logic unit from said plurality of DC power supplies uniform.

2. A power supply for an electronic device according to claim 1, wherein each of said first and said second AC power supply is composed of an induction motor driven by commercial three-phase AC and a generator coupled directly with said induction motor and outputs an AC having a frequency higher than the frequency of the commercial three-phase AC.

3. A power supply for an electronic device according to claim 1, wherein each of said first and said second AC power supply includes a voltage control mechanism so that voltages of outputted ACs can be controlled independently from each other so as to be variable.

4. A power supply for an electronic device according to claim 1, wherein a part of said first reference potential bus bar is formed in one body together with a part of said second reference potential bus bar between said connecting part with the reference potential of said plurality of DC power supplies and the other connecting part with said logic unit.

5. An electronic device composed of a plurality of logic units comprising:

a first AC power supply stabilizing AC supplied by commercial AC network to output it and a second AC power supply disposed in parallel with respect to said first AC power supply and similarly stabilizing AC supplied by the same commercial AC network to output an AC having a frequency, which is asynchronous to the frequency of the AC outputted by said first AC power supply;

a plurality of DC power supplies connected with said first AC power supply and converting the AC supplied by said first AC power supply into DC to output it;

a plurality of DC power supplies connected with said second AC power supply and converting the AC supplied by said second AC power supply into DC to output it;

a first reference potential bus bar applying a reference potential to said logic units, one end of which is connected at a connecting part with said plurality of DC power supplies connected with said first AC power supply in common, and another end of which is sufficiently far from said connecting part and connected with said logic units at another connecting part;

a second reference potential bus bar applying a reference potential to said logic units, one end of which is connected at a connecting part with said plurality of DC power supplies connected with said second AC power supply in common, and another end of which is sufficiently far from said connecting part and connected with said logic units a another connecting part, a part of a path thereof between the two connecting parts being located away from said first reference potential bus bar;

a plurality of connecting bus bars applying voltages necessary for driving LSIs within said logic units thereto, one end of each of which is connected with a voltage output terminal of each of said plurality of DC power supplies, and another end of each of which is connected with said logic unit; and a board disposed on said logic unit, whose potential itself serves as a reference potential, the other ends of said first and said second reference potential bus bar, which ends are different from said connecting parts connected with the reference potentials of said DC power supplies, being connected with said board so as to make the reference voltage applied to said logic unit from said plurality of DC power supplies uniform.

6. An electronic device according to claim 5, wherein each of said first and said second AC power supply is composed of an induction motor driven by commercial three-phase AC and a generator coupled directly with said induction motor and outputs an AC having a frequency higher than the frequency of the commercial three-phase AC.

7. An electronic device according to claim 5, wherein each of said first and said second AC power supply includes a voltage control mechanism so that voltages of outputted ACs can be controlled independently from each other so as to be variable.

8. An electronic device according to claim 5, wherein a part of said first reference potential bus bar is formed in one body together with a part of said second reference potential bus bar between said connecting part with the reference potential of said plurality of DC power supplies and the other connecting part with said logic unit.

9. An electronic device, comprising:
   at least two AC power supplies, respectively providing different alternating currents;
   a plurality of DC power supplies respectively connected to input the alternating current from said AC power supplies and respectively output DC currents, so that the DC currents have ripples correlated to the alternating currents, which ripples tend to differ from each other in phase and frequency corresponding to differences in phase and frequency of the AC currents so that when combined the ripples will tend to beat;
   a plurality of reference bus bars respectively connected to said plurality of DC power supplies for separately transmitting a reference voltage of said DC currents respectively and for providing inductance damping the ripples;
   an electronic unit having a reference volt node connected to said reference bus bars at a location remote from a connection of said reference bus bars to said DC power supplies with a spacing being sufficient to provide inductance damping that will reduce a magnitude of the ripples by at least a factor of 2, and said electronic unit having a plurality of separate electronic circuits, each having a reference input connected to said reference voltage node and a power input; and
   a plurality of conductors respectively connecting the power inputs of said electronic circuits with said DC power supplies.

10. An electronic device according to claim 9, wherein said AC power supplies include means for individually adjusting the voltage of the alternating currents.

11. An electronic device according to claim 9, wherein there are a plurality of said DC power supplies connected to each of said AC power supplies.

12. An electronic device according to claim 9, wherein said electronic unit includes a common reference voltage frame establishing the reference voltage node.

13. An electronic device according to claim 9, wherein said reference bus bars reduce the ripple magnitude by a factor of at least ten.

14. An electronic device according to claim 13, wherein said reference bus bars reduce the ripple sufficiently that a beat produced by the ripples combining at the reference voltage node in said electronic unit is reduced more than twenty percent as compared to said reference potential bus bars being directly connected together at said DC power supplies.

15. An electronic device according to claim 14, wherein said electronic unit is a logic unit and said electronic circuits are LSIs.

16. An electronic device according to claim 9, wherein each of said AC power supplies includes an induction three-phase AC motor and a DC generator drivingly coupled to said induction motor.

17. An electronic device according to claim 16, wherein said AC power supplies independently control their output voltage to vary over a range having a low voltage that is at least one-half a high voltage.

18. An electric device according to claim 9, wherein each of said reference bus bars is an elongated metal electric conductor having one end connected to at least one corresponding DC power supply and an opposite end connected to said reference voltage node of the electronic unit.

19. An electronic device according to claim 9, wherein said AC power supplies are asynchronous.

20. An electronic device according to claim 9, further including said reference bus bars being generally coextensive and spaced from each other, and an insulator extending between said reference bus bars to form with said reference potential bus bars a single body.

21. An electronic device according to claim 9, wherein said electronic unit includes a common reference voltage frame establishing the reference voltage node; and
   wherein said frame is a backboard frame completely surrounding said electronic unit, and wherein said reference potential bus bars are respectively directly connected at opposite sides of said frame.

22. An electronic device according to claim 9, wherein said DC power supplies directly pass any difference in input phase of the alternating currents as a phase difference in the ripples of the DC currents without regulation so that phases of the ripples contained in the DC currents are slightly deviated from each other by the same amount that frequencies of the alternating currents deviate from each other.

23. An electronic device according to claim 22, wherein said reference bus bars at least partially constitute means for separating the reference potential of said DC currents between said DC power supplies and said electronic unit while reducing ripple of the DC currents, respectively.

24. An electronic device according to claim 23, wherein said reference bus bars reduce the ripple magnitude by a factor of at least ten.

25. An electronic device according to claim 23, wherein said electronic unit includes a common reference voltage frame establishing the reference voltage node; and
   wherein said frame is a backboard frame completely surrounding said electronic unit, and wherein said reference potential bus bars are respectively directly connected at opposite sides of said frame.

26. An electronic device according to claim 25, wherein said AC power supplies independently control their output voltage to vary over a range having a low voltage that is at least one-half a high voltage;

27. An electronic device according to claim 26, wherein said reference bus bars reduce the ripple sufficiently that a beat produced by the ripples combining at the reference voltage node in said electronic unit is reduced more than twenty percent as compared to said reference potential bus bars being directly connected together at said DC power supplies;
   wherein said electronic unit is a logic unit and said electronic circuits are LSIs;
   wherein each of said AC power supplies includes an induction three-phase AC motor and a DC generator drivingly coupled to said induction motor; and
   wherein said DC power supplies directly pass any difference in input phase of the alternating currents as a phase difference in the ripples of the DC currents without regulation so that phases of the ripples contained in the DC currents are slightly deviated from each other by the same amount that frequencies of the alternating currents deviate from each other.

28. An apparatus according to claim 9, further including means commonly providing a single alternating current as input to said AC power supplies; and
   wherein said AC power supplies output the alternating currents at substantially a single frequency, with slight frequency and phase difference.

29. An apparatus according to claim 28, wherein said AC power supplies output the alternating currents at a frequency that is a whole integer multiple of a frequency of the single alternating current.

30. An apparatus according to claim 28, wherein said AC power supplies include means for individually adjusting the voltage of the alternating currents.

31. An apparatus according to claim 30, wherein said DC power supplies directly pass any difference in input phase of the alternating currents as a phase difference in the ripples of the DC currents without regulation so that phases of the ripples contained in the DC currents are slightly deviated from each other by the same amount that frequencies of the alternating currents deviate from each other.

32. Apparatus, comprising:
   a plurality of independently DC powered electric devices mounted together as an electronic unit;
   an input;
   a first AC power supply stabilizing AC supplied at said input by a commercial AC network to output a first alternating current at a frequency difference from the commercial AC network;
   a second AC power supply in parallel with said first AC power supply and stabilizing the AC supplies at said input by the commercial AC network to output a second alternating current at a frequency asynchronous to the frequency of the first alternating current;
   a first DC power supply connected with said first AC power supply and converting the first alternating current into DC and outputting a first direct current with a first ripple, at a first voltage having a first reference level and a first voltage level;
   a second DC power supply connected with said second AC power supply and converting the second alternating current into DC and outputting a second direct current with a second ripple, at a second voltage with a second reference level and a second voltage level;
   a first reference potential bus bar for applying a reference potential to the electronic devices, and having one end connected to said first DC power supply and another end connected with said electronic devices for transmitting the first reference level of the first direct current separately from the second reference level of the second direct current;
   a second reference potential bus bar for applying a reference potential to the electronic devices, and having one end connected to said second DC power supply and another end connected with said electronic devices for transmitting the second reference level of the second direct current along a path located away from said first reference potential bus bar;
   first and second connecting bars for respectively applying the first and second voltage levels independently to difference ones of said electronic devices, and each having one end connected with a respective one of said first and second DC power supplies and another end connected with a respective one of said electronic devices;
   said electronic devices having a common reference voltage node connected to the another ends of said first and said second reference potential bus bars; and
   the one and another ends being sufficiently far apart to provide a current path length that together with a reference potential bus bar cross-section between the one and another ends provides inductance that reduces the ripple in the respective first and second direct currents so that a beat formed at the common reference voltage node by the first and second ripples will be reduced at least about 20% as compared to a beat that would be formed when the one ends of said first and second reference potential bus bars are electrically connected.

33. An apparatus according to claim 32, wherein said AC power supplies output the alternating currents at a frequency that is a whole integer multiple of a frequency of the single alternating current; and
   wherein said AC power supplies output the alternating currents at substantially a single frequency, with slight frequency and phase difference.

34. An apparatus according to claim 33, wherein said AC power supplies include means for individually adjusting the voltage of the alternating currents.

35. An apparatus according to claim 34, wherein said DC power supplies directly pass any difference in input phase of the alternating currents as a phase difference in the ripples of the DC currents without regulation so that phases of the ripples contained in the DC currents are slightly deviated from each other by the same amount that frequencies of the alternating currents deviate from each other.

36. An apparatus according to claim 32, wherein said DC power supplies directly pass any difference in input phase of the alternating currents as a phase difference in the ripples of the DC currents without regulation so that phases of the ripples contained in the DC currents are slightly deviated from each other by the same amount that frequencies of the alternating currents deviate from each other.

37. An apparatus according to claim 36, wherein said AC power supplies include means for individually adjusting the voltage of the alternating currents.

38. An apparatus according to claim 32, wherein said AC power supplies include means for individually adjusting the voltage of the alternating currents.

* * * * *